(12) United States Patent
Jones et al.

(10) Patent No.: US 8,290,471 B1
(45) Date of Patent: Oct. 16, 2012

(54) METHOD AND SYSTEM FOR MOBILE DATA USAGE ACCOUNTING

(75) Inventors: Bryce A. Jones, Overland Park, KS (US); Rodney Nelson, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 553 days.

(21) Appl. No.: 12/436,609

(22) Filed: May 6, 2009

(51) Int. Cl.
*H04M 11/00* (2006.01)

(52) U.S. Cl. ........ 455/406; 455/405; 455/407; 455/408; 379/111; 379/114.01; 705/52

(58) Field of Classification Search .......... 455/405, 455/406, 407, 408, 409, 410
See application file for complete search history.

(56) References Cited

U.S. PATENT DOCUMENTS

| | | | |
|---|---|---|---|
| 2003/0220093 A1* | 11/2003 | Fellenstein et al. | 455/405 |
| 2006/0040642 A1* | 2/2006 | Boris et al. | 455/407 |
| 2007/0253371 A1* | 11/2007 | Harper et al. | 370/331 |
| 2008/0182552 A1* | 7/2008 | Dinh et al. | 455/408 |
| 2009/0129271 A1* | 5/2009 | Ramankutty et al. | 370/235 |

* cited by examiner

*Primary Examiner* — Anthony Addy
*Assistant Examiner* — Khalid Shaheed (57) ABSTRACT

Disclosed herein are methods and systems for initiating record-keeping processes for usage of communication services by subscribers. An exemplary method may be implemented in an access network wherein two or more types of subscription plans are available to the subscribers, including an unlimited-use subscription plan. An exemplary method involves (a) receiving a connection request from a subscriber to engage in a communication session via an access network; (b) before providing the requested connection, making a determination as to whether or not the subscriber is enrolled in an unlimited-use subscription plan; (c) if the determination is that the subscriber is not enrolled in the unlimited-use subscription plan, then initiating a process to generate enhanced usage records for the communication session; and (d) if the determination is that the subscriber is enrolled in the unlimited-use subscription plan, then refraining from initiating a process to generate enhanced usage records for the communication session.

18 Claims, 4 Drawing Sheets

METHOD AND SYSTEM FOR MOBILE DATA USAGE ACCOUNTING

BACKGROUND

Currently, when a user signs up for data communication service, the service provider may provide the user, who is now a "subscriber", with a palette of service plans from which to choose. One such service plan might allow the user to engage in an unlimited quantity of data communication for a fixed monthly recurring charge. Other service plans might provide different charges for different quantities of data, plus a per-unit charge for communication of data beyond the quantity allotted. For instance, one plan might allow the user to communicate up to 5 megabytes of data per month for $5.00 with a charge of $0.08 for each additional kilobyte, another plan might allow the user to communicate up to 10 megabytes of data per month for $10.00 with a charge of $0.07 for each additional kilobyte, and another plan might allow the user to communicate up to 30 megabytes of data per month for an MRC of $20.00 with a charge of $0.06 for each additional kilobyte.

To facilitate invoicing subscribers for their service plan, service providers typically implement record-generation and record-keeping functionality in their access networks. In particular, service providers may implement functionality to generate usage records in access network gateways, such as a packet-data serving node (PDSN), and may implement deep packet inspection (DPI) functionality along the communication path used by subscribers, typically in an entity referred to as a home agent (HA). Usage records are typically generated on a per-subscriber and per-session basis, and include such information as the session ID, the subscriber ID, the destination address for a data session, and/or the amount of usage (e.g., kilobytes of data, or minutes of voice communication) during a session, among other information. These usage records may then be used by a service provider for billing purposes, and in particular, to generate monthly invoices for subscribers.

Overview

A service provider may offer communication services under various types of subscription plans, such as unlimited-use subscription plans and pay-per-use plans. An unlimited-use subscription plan is typically a plan for which a subscriber pays a flat fee for unlimited use of data networks and/or unlimited calling, for instance. Other examples of pay-per-use plans are also possible. A subscription plan where a user simply pays a per-unit fee (often referred to as "pay-as-you-go" or "pay-per-use" plans) for usage, possibly with an additional base fee, may also be considered a pay-per-use plan. Service providers may also offer subscription plans where a subscriber pays a flat fee for a predetermined amount or quota of usage (e.g., a certain quantity of data or a certain number of minutes for voice communications) in each billing cycle, and then pays a per-unit overage fee (e.g., a per-kilobit of data or per-minute fee) for any usage in excess of the defined amount. Such a subscription plan, which may also be referred to as "capped-use" subscription plan, may be treated as pay-per-use plan or an unlimited-use plan, or as a hybrid of the two (e.g., as an unlimited-use plan until the quota is used, and as a pay-per-use plan thereafter), or may be treated in another manner altogether. While the above types of subscription plans are generally representative of the plans currently offered by service providers, it should be understood that other types of service plans are also within the scope of the invention.

The present invention may be implemented by a communication-service provider, as well as other entities, in order to maintain usage records for subscribers' usage of communication services. Further, the manner in which a service provider creates usage records for a subscriber may vary depending upon the type of subscription plan in which a subscriber is enrolled. The usage records may then be used for billing purposes and/or for other purposes.

More specifically, for unlimited-use subscribers, detailed records may be unnecessary, as there is no need to bill the subscriber on a per-unit basis. Thus, the service provider my not need the detailed records that are typically generated in existing accounting and billing systems, for unlimited-use subscribers. Furthermore, since an unlimited-use subscriber does not pay on a per-unit basis, they may be less concerned with being provided a detailed bill (such as a bill with itemized call-by-call list) than a pay-per-use subscriber or a capped-use subscriber. As the popularity of unlimited-use plans grows, the amount of records being generated and/or stored for unlimited-use subscribers, and which may be deemed unnecessary by service providers as well as subscribers, is growing rapidly. Accordingly, exemplary methods and systems are provided herein that may help to reduce the volume of usage records being generated for unlimited-use subscribers.

In one aspect, a method for initiating record-keeping processes for usage of communication services by subscribers is disclosed. The method may be implemented in an access network where two or more types of subscription plans are available to the subscribers, wherein the two or more types of subscription plans comprise an unlimited-use subscription plan and at least one other type of subscription plan. The method involves (a) receiving a connection request from a subscriber to engage in a communication session via an access network; (b) before providing the requested connection, making a determination as to whether or not the subscriber is enrolled in an unlimited-use subscription plan; (c) if the determination is that the subscriber is not enrolled in the unlimited-use subscription plan, then initiating a process to generate enhanced usage records for the communication session; and (d) if the determination is that the subscriber is enrolled in the unlimited-use subscription plan, then refraining from initiating a process to generate enhanced usage records for the communication session.

The method may further involve, if the determination is that the subscriber is not enrolled in the unlimited-use subscription plan, initiating a process to generate bulk usage records for the communication session. For a subscriber that is enrolled in an unlimited-use subscription plan, the method may also involve initiating a process to generate bulk usage records for the communication session. Alternatively, for an unlimited-use subscriber, no records may be generated.

In a further aspect, a system configured to initiate record-keeping processes for usage of communication services by subscribers is disclosed. Preferably, the system is implemented in or in association with an access network where two or more types of subscription plans are available to the subscribers, wherein the two or more types of subscription plans comprise an unlimited-use subscription plan and at least one other type of subscription plan. The system comprises (a) a communication interface configured to receive a connection request from a subscriber to engage in a communication session via an access network; (b) at least one processor; and (c) program instructions stored in data storage and executable by the at least one processor to: (i) before or while resources are being allocated for the requested communication session, determine whether or not the subscriber is enrolled in an unlimited-use subscription plan; (ii) if the subscriber is not enrolled in the unlimited-use subscription plan, then initiate a process to generate one or more enhanced usage records for the communication session; and (iii) if the subscriber is enrolled in the unlimited-use subscription plan, then refrain from initiating the process to generate enhanced usage records for the communication session.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

An exemplary embodiment of the present invention is described herein with reference to the drawings, in which.

DETAILED DESCRIPTION

Disclosed herein are record-keeping methods and systems for communication-service subscribers. For purposes of illustration, the description below is generally by way of example with reference to a Code Division Multiple Access (CDMA) radio access network (RAN) in which the access gateway takes the form of a packet data serving node (PDSN). It should be understood that the invention is not limited to the described embodiments, and may include other configurations, which involve other types of access networks and/or access gateways, or differ in other ways, without departing from the scope of the invention.

I. Network Architecture

Figure 1:
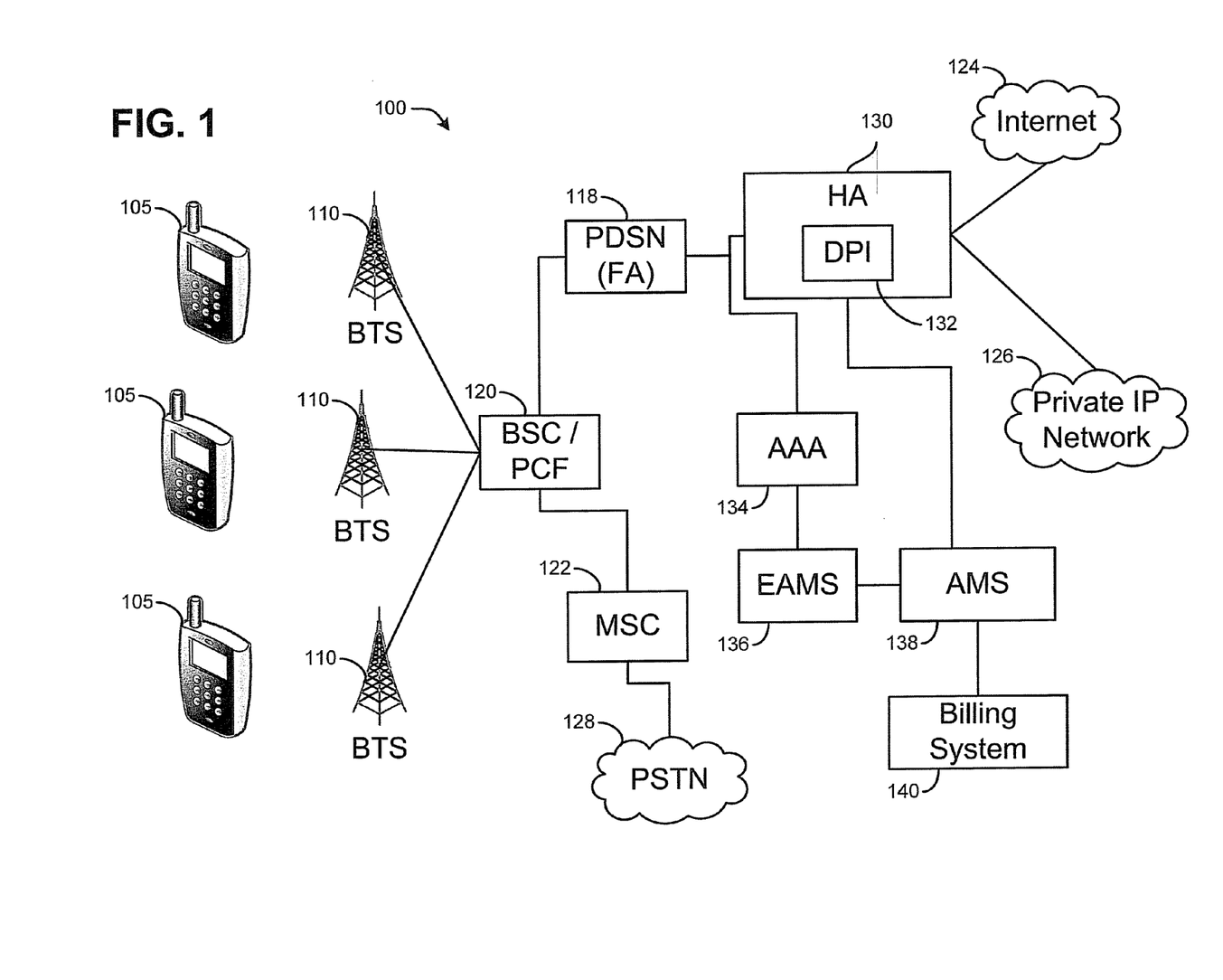
FIG. 1 is a simplified block diagram of an exemplary communication network, according to an exemplary embodiment.

FIG. 1 is a simplified block diagram of an exemplary communication network 100, in which exemplary embodiments may be employed. Network 100 includes one or more wireless communication devices (WCDs) 105, base transceiver stations (BTSs) 110, base station controllers/packet control functions (BSCs/PCFs) 120, mobile switching centers (MSCs) 122, packet-data serving nodes (PDSNs) 118 (each of which may also function as a foreign agent (FA)), home agents (HAs) 130 (which may include a deep packet inspection (DPI) system 132), and authentication, authorization and accounting (AAA) servers 134. These components may connect in various ways to public switched telephone network (PSTN) 128, private IP network 126, and Internet 124. The combination of network elements including BTSs 110, BSC/PCF 120, and MSC 122 may be collectively referred to as a RAN. The combination of network elements including PDSNs 118, HAs 130, AAAs 134, and/or DPIs 132 may be referred to as core network components.

Also shown in the network 100 are mediation systems, which generally function to aggregate and/or store usage records. In particular, the network 100 includes an Enhanced Accounting Management System (EAMS) 136 and an Accounting Mediation System (AMS) 138. EAMS 136 and AMS 138 typically function to aggregate usage records generated by core network components (e.g., different AAAs, PDSNs, HAs, DPI elements, etc.) and provide the usage records to a billing system 140 for billing purposes. While EAMS 136 and AMS 138 are shown as separate systems, it should be understood that EAMS 136 and AMS 138 may be combined as a single mediation system. Further, other mediation systems may be used in addition, or in the alternative, to EAMS 136 and/or AMS 138.

The components of FIG. 1 may each include at least one processor, data storage in the form of memory, and program instructions stored in the memory and executable by the at least one processor to carry out the functions described herein. Furthermore, these components may operate in accordance with various types of wireless protocols, such as Code Division Multiple Access (CDMA), Worldwide Interoperability for Microwave Access (WIMAX), Universal Mobile Telecommunications System (UMTS), or other protocols now known or later developed. However, a RAN may also be defined to comprise more or fewer elements.

BTSs 110 radiate to define wireless coverage areas. Each wireless coverage area may provide air interface access to WCDs 105 and any other wireless communication devices served by the wireless coverage area. A single BTS 110 may define one or more wireless coverage areas. The air interface may include forward links for transmitting information from a BTS 110 to WCDs 105 (in the forward direction) and reverse links for transmitting information from WCDs 105 to a BTS 110 (in the reverse direction). BTSs 110 and WCDs 105 exchange signaling, voice, data, video, or other media through the forward and reverse links. Although FIG. 1 shows only three BTSs 110, network 100 may include fewer or more than three BTSs 110.

WCDs 105 could be wireless telephones, wireless personal digital assistants, wirelessly equipped laptop computers, wireless routers, or other types of mobile or fixed wireless devices. Preferably, a WCD is a subscriber device, which may be manipulated by a human in order to establish circuit-based or packet-based voice and/or data calls into the RAN and core network. However WCD 105 could also be an automated device without a human interface. Typically a WCD 105 is associated with one or more BTSs 110 at a time and uses the wireless coverage areas of these BTSs to communicate with correspondent nodes, such as web servers, gaming servers, VoIP signaling proxies, VoIP bearer gateways, and other WCDs 105. WCDs 105 may also be able to transfer ongoing communication sessions from one BTS 110 to another in a handoff process.

A BSC/PCF 120 comprises two logical devices, a BSC and a PCF, which are combined in FIG. 1 for purposes of simplicity. In practice, the BSC and PCF may be separate physical devices or may be software elements on the same physical device. The BSC portion of BSC/PCF 120 may control multiple BTSs 110 by determining how each BTS 110 manages the WCDs 105 in the BTS's wireless coverage areas. For example, a BSC may instruct a BTS 110 to assign wireless channels to a WCD 105, increase or decrease power to a WCD 105, or handoff a WCD 105 to a different BTS 110. Voice and data traffic to and from each WCD 105 flows through a BSC. Preferably, the BSC routes circuit-switched communications to an MSC 122 and packet-switched communications to a PDSN 118. A BSC may, alone or in conjunction with AAA server 134, authenticate WCDs 105 that request RAN services.

When present, the PCF portion of the BSC/PCF 120 is preferably the RAN's interface to PDSNs 118. A PCF relays a WCD's packets between the RAN and the WCD's assigned PDSN 118. The PCF maintains a list of candidate PDSNs 118 to which an incoming call from a WCD 105 can be assigned, and the PCF selects a PDSN 118 from this list for each incoming call. In other arrangements, another entity may carry out some or all of these functions.

An MSC 122 performs many of the functions of a Class 5 telephony switch, but with additional functionality to manage the mobility of the end-subscriber devices, such as WCDs 105. For example, an MSC 122 may comprise a visitor location register (VLR) and a home location register (HLR), and may facilitate short message service (SMS) functions. In general, the MSC 122, is responsible for switching functions, media transport functions, and managing the communications between WCDs 105 and the PSTN 128.

A PDSN 118 may be a router-like device that manages the connectivity of WCDs 105 to a packet-switched network. A PDSN 118 may serve tens, hundreds, thousands or more WCDs 105 via point-to-point protocol (PPP) links to each WCD 105. However, a PPP link to a WCD 105 is not required for a PDSN 118 to serve a WCD 105. A PDSN 118 may also authenticate WCDs 105, or, in conjunction with AAA server 134, facilitate authentication of WCDs 105. Once a WCD 105 is authenticated, its serving PDSN 118 will grant the WCD 105 access to a public IP network such as the Internet 124 and/or a private IP network 126.

PDSNs 118 may either connect directly to Internet 124 and/or private IP network 126, and/or may serve as a mobile IP foreign agent (FA), and connect to these packet-switched networks through a home agent (HA). If the PDSN 118 connects directly to a packet-switched network, then the PDSN 118 preferably performs typical remote access functions, such as assigning a home IP address, next-hop gateway IP address, and DNS server IP addresses to each WCD 105 that the PDSN 118 serves. If the PDSN 118 instead serves as an FA, then its associated HA may perform some, or all, of these remote access functions. In the illustrated network, PDSN 118 serves as a FA, and thus routes communications through HA 130.

An HA 130 is preferably an anchor point for WCDs 105 that are configured for mobile IP communications. As is described in Internet Request for Comments (RFC) 2002, "IP Mobility Support for IPv4," incorporated by reference herein, mobile IP is a well known network protocol that facilitates a WCD 105 roaming between multiple foreign agents by having an HA 130 assign an IP address to the WCD 105. (In network 100, the foreign agents are preferably implemented by PDSNs 118, but may be implemented in other devices in network 100 or other devices not shown.) Thus, as a WCD 105 changes its point of attachment to a network, the WCD 105 is able to maintain the same IP address. Preferably, all traffic between a WCD 105 and Internet 124 or private IP network 126 passes through the HA 130 that anchors the WCD 105. An HA 130 may also authenticate WCDs 105, or, in conjunction with AAA server 134, facilitate authentication of WCDs 105. Once a WCD 105 is authenticated, an HA 130 will grant the WCD 105 access to Internet 124 and/or private IP network 126.

Preferably, HA 130 is also configured with a deep packet inspection (DPI) system 132, which provides DPI functionality. DPI system 132 may be a physically distinct component or may be incorporated in PDSN 118, HA 130 (as shown), or other network components. In general, a DPI system may be located anywhere along the communication between a WCD and its destination, without departing from the scope of the invention.

By performing deep packet analysis with a device such as DPI system 132, the operator of network 100 may be able to collect various types of information about the subscribers of network 100, such as popular destinations and services, and well as the interests of the WCDs' 105 subscribers. More specifically, DPI system 132, by inspection of data packets routed through it, may determine information such the session ID of the session to which the packets belong, the subscriber or user ID for the originating subscriber, the destination of the packets (e.g., the Internet or private IP network address for which the packets are intended), etc. Further, DPI system 132 may examine the Transmission Control Protocol (TCP) or User Datagram Protocol (UDP) port numbers in packets to determine the applications that each WCD 105 is using. Even further, DPI may be used to examine the application payload in packets to determine the data contents and/or data size for a session.

AAA server 134 is typically a device that maintains a profile for each WCD 105 registered with the operator of network 100. This profile may contain an indication of the identity of each WCD 105 (e.g., a subscriber ID associated with the owner of the WCD) and other information, such as a WCD's hardware identifier, IMSI, username, password, as well as any other information, either general or specific to the given WCD 105. When a WCD 105 sends a request to connect to network 100, the PDSN 118 may transmit an access-request message to AAA server 134. If AAA server 134 determines that the WCD 105 is authorized to use network 100 and that the WCD 105 has presented an indication of the proper credentials (e.g., username and password), AAA server 134 may transmit an access-response to the PDSN 118, thus allowing the WCD 105 to log on to network 100. The interface that PDSN 118 uses to access AAA server 134 may be one of the well known network protocols RADIUS (see for example, Internet RFC 2865, "Remote Authentication Dial In Subscriber Service (RADIUS)," incorporated herein by reference) or DIAMETER (see for example, Internet RFC 3588, "Diameter Base Protocol," incorporated herein by reference), or a similar protocol.

AAA server 134 may also collect accounting information per WCD 105, typically from PDSN 118 and/or HA 130, and possibly other entities. This accounting information may include the amount of data that network 100 has transferred on behalf of WCD 105. Thus, this accounting information may incorporate the number of bytes transmitted in the forward direction to the WCD 105, the number of bytes transmitted in the reverse direction by the WCD 105, the duration of the WCD's session with the RAN, information about the RAN's characteristics, and potentially other information as well.

II. Generation of Usage Records

In an exemplary embodiment, two general types of usage records are generated for a given communication session: (1) bulk usage records and (2) enhanced usage records. In particular, data gathered by the AAA 134 and/or PDSN/FA 118 the may be used by the PDSN and/or AAA to generate bulk usage records, while data gathered by DPI system 132 may be used to generate enhanced usage records.

A. Bulk Usage Records

Each bulk usage record contains a subscriber ID identifying the subscriber engaged in the corresponding communication, a session ID identifying the particular session, as well as data indicating how many bytes the subscriber has used (in the case of a data session) or how long the subscriber has been on a call (in the case of a voice session). Other information and data may also be included in a bulk usage record. According to an exemplary embodiment, the PDSN/FA 118 (possibly in conjunction with AAA server 134) may initiate a process to generate bulk usage records.

More specifically, for each data session that passes through the PDSN 118, the PDSN 118 may generate and send one or more usage detail records (UDRs) to a designated AAA server 134. In particular, at the start of the session, the PDSN 118 may send a START UDR, at the end of the session, the PDSN may send a STOP UDR, and periodically during the session, the PDSN 118 may send other UDRs. The UDRs may be compliant with the RADIUS or DIAMETER protocol, and may provide information such as a session ID, a subscriber ID, the subscriber's assigned IP address, and the number of bytes of data communicated so far during the session. Each UDR is typically formatted as a database record with predefined fields. Typically each PDSN will be programmed to send its UDRs to a particular AAA server.

The AAA server 134 may then aggregate UDRs received from the PDSNs that it serves. In particular, to serve geographically dispersed PDSNs, a carrier may thus provide numerous AAA servers, each of which may collect UDRs from various PDSNs. Each AAA server 134 may therefore receive UDRs from the PDSNs 118 with which it is associated. Periodically, such as every fifteen minutes (or possibly in response to a triggering event, such as the receipt of a UDR) each AAA server 134 may programmatically send the EAMS 136 the UDRs that it has received.

The EAMS 136 may function to aggregate UDRs from multiple PDSN/FAs and AAA servers, on a session-by-session basis. This can be important in a mobile communication system, where subscriber stations move from access network to access network during the course of a given session, since in that case multiple AAA servers may provide UDRs for a common session. For each session, the EAMS 136 may periodically generate and send to the AMS 138 an IP Data Record (IPDR), which specifies a session ID, a subscriber ID, and the quantity of data communicated so far in the session.

The AMS 138 in turn may function to aggregate IPDRs that it receives from the EAMS 136 into incremental IPDRs. For example, on a session-by-session basis, the AMS 138 may periodically aggregate the IPDRs for a given session to generate an incremental IPDR that specifies a session ID, a subscriber ID, and the quantity of data communicated since the last incremental IPDR generated by AMS 138. Further, the AMS 138 may send each incremental IPDR to the billing system 140.

The billing system 140 may then use the incremental IPDR to generate bulk usage records, which typically include the amount of usage (e.g., quantity of data or number of minutes) for a given user on a session-by-session basis. Further, when generating an invoice, as is typically done a monthly basis, the billing system 140 may use the bulk usage records to determine a bulk usage total for each subscriber.

B. Enhanced Usage Records

In an exemplary embodiment, DPI system 132 is be configured to inspect packets during a session and generate enhanced usage records for the session. The enhanced usage records generated by a DPI system 132 may be referred to as enhanced usage detail records (E-UDRs). (The usage records generated using DPI functionality are also commonly referred to as UDRs. However, the term E-UDR is used herein to distinguish between E-UDRs and the UDRs generated during the process of generating bulk usage records.) Further, DPI system 132 may be configured to send E-UDRs to AMS 138. DPI system 132 may use the RADIUS or DIAMETER protocols (or any other appropriate protocol) to provide enhanced usage records to AMS 138 or to other entities More specifically, DPI system 132 may determine the number of bytes transferred by the WCD 105 on a per session basis, a per remote-IP address basis, per transport layer protocol basis, and/or per application basis. As a specific example, if the WCD transfers data during a particular communication session, DPI system 132 may determine the source and destination IP address associated with the session, the source and destination TCP port numbers associated with the session, when the TCP session began, when the TCP session ended, the number of bytes transferred during the session, and/or other information.

In a further aspect, the DPI system 132 may classify the type of communication in which a subscriber is engaged as "billable" or "non-billable" (i.e., free). For example, DPI system 132 may determine a subscriber's destination (e.g., destination IP address, URL, etc.), and whether the subscriber is accessing a destination or accessing content that is provided free-of-charge (such as emergency services, a service provider's customer support webpage, etc.), or whether the subscriber may be charged for the communication. Alternatively, DPI system 132 may not determine billable status, and may not include billable status in E-UDRs. In such embodiments, this classification may be performed by AMS 138 and/or billing system 140, which may include or have access to a reference database that indicates which destination addresses are billable and/or non-billable. Other techniques for determining billable status are also possible.

DPI system 132 may generate one or more E-UDRs for a session based upon its inspection of packet data routed through DPI system 132 during the session. Each E-UDR typically includes a session ID, a subscriber ID, a quantity of usage, and an indication of the type of communication (i.e., billable or non-billable). An E-UDR may also include other information obtained using DPI functionality, such as the specific destination for the session. Each E-UDR may then be sent to AMS 138, which in turn may aggregate the E-UDRs, and provide the aggregated E-UDRs to billing system 140.

Provided with bulk usage records and enhanced usage records, billing system 140 may implement various billing techniques. For example, for a pay-per-use subscriber the billing system may determine the bulk usage total, and then determine the non-billable usage total from the E-UDRs. The billing system may then subtract the non-billable usage total from the bulk usage total to arrive at a billable total. For instance, the billing system may determine the quantity of data (total kB, MB, GB, etc.) or total duration of calls (e.g., total number of minutes) that are non-billable, and subtract this from the bulk usage total, to determine the total billable quantity of data or total number of billable minutes. The billing system may then bill the subscriber for the total billable usage on a per-unit basis (e.g., $5 per MB of data, $0.10 per minute, etc.).

As another example, for subscribers who pay a fixed fee for a predetermined amount of usage, and then pay overage (e.g., $10 for 2 MB of data, and $0.01 for every kB thereafter, or $40.00 for 450 minutes, and $0.25 for every minute thereafter), the billing system may also determine a bulk usage total. However, the billing system then subtracts the predetermined amount of usage and the non-billable usage total from the bulk usage total to determine overage usage, for which the subscriber is billed on a per-unit basis. (Note that if the total overage is calculated to be negative (i.e., the billable total is less than the predetermined amount of usage), overage usage is typically set to be zero.) The billing system may then bill the subscriber for the fixed fee plus the total overage (if any) on a per-unit basis.

For an unlimited-use subscriber, the billing system typically just charges the fixed fee as specified by the subscriber's subscription agreement. Accordingly, while existing networks are typically configured to generate bulk usage records and detail usage records for all customers, and existing AMS systems are typically configured to store bulk usage records and detail usage records for all customers, billing system 140 ultimately does not use some or all of the usage records for unlimited-use subscribers. Accordingly, an exemplary method may help to reduce unnecessary record keeping for unlimited-use subscribers.

III. Exemplary Methods for Initiating Record-Keeping Processes

To help reduce the volume of usage records being generated and/or stored, an exemplary method involves refraining from keeping E-UDRs or possibly even refraining from keeping any usage records whatsoever, for subscribers that are enrolled in an unlimited-use subscription plan. For subscribers enrolled in a pay-per-use subscription plan, on the other hand, the method involves keeping more extensive usage records (e.g., both bulk and detail usage records).

Preferably, the method is implemented by a gateway, such as a PDSN, thereby reducing the volume of usage records that are generated by the DPI system and/or PDSN, before usage records are sent to entities such as the EAMS, the AMS, and/or the billing system. Further, by reducing the volume of usage records early on in the record-keeping process, processing demands upon entities such as the AAA, HA, DPI system, the EAMS, and/or the AMS may be reduced. For example, a PDSN/FA may detect when a subscriber connects that the subscriber has an unlimited-use data plan, and responsively signal to its corresponding HA to refrain from using DPI and sending E-UDRs. As a result, data storage that would otherwise be used to store E-UDRs in a mediation system (such as an AMS) and/or in a service provider's billing system, may be made available for other purposes.

Figure 2:
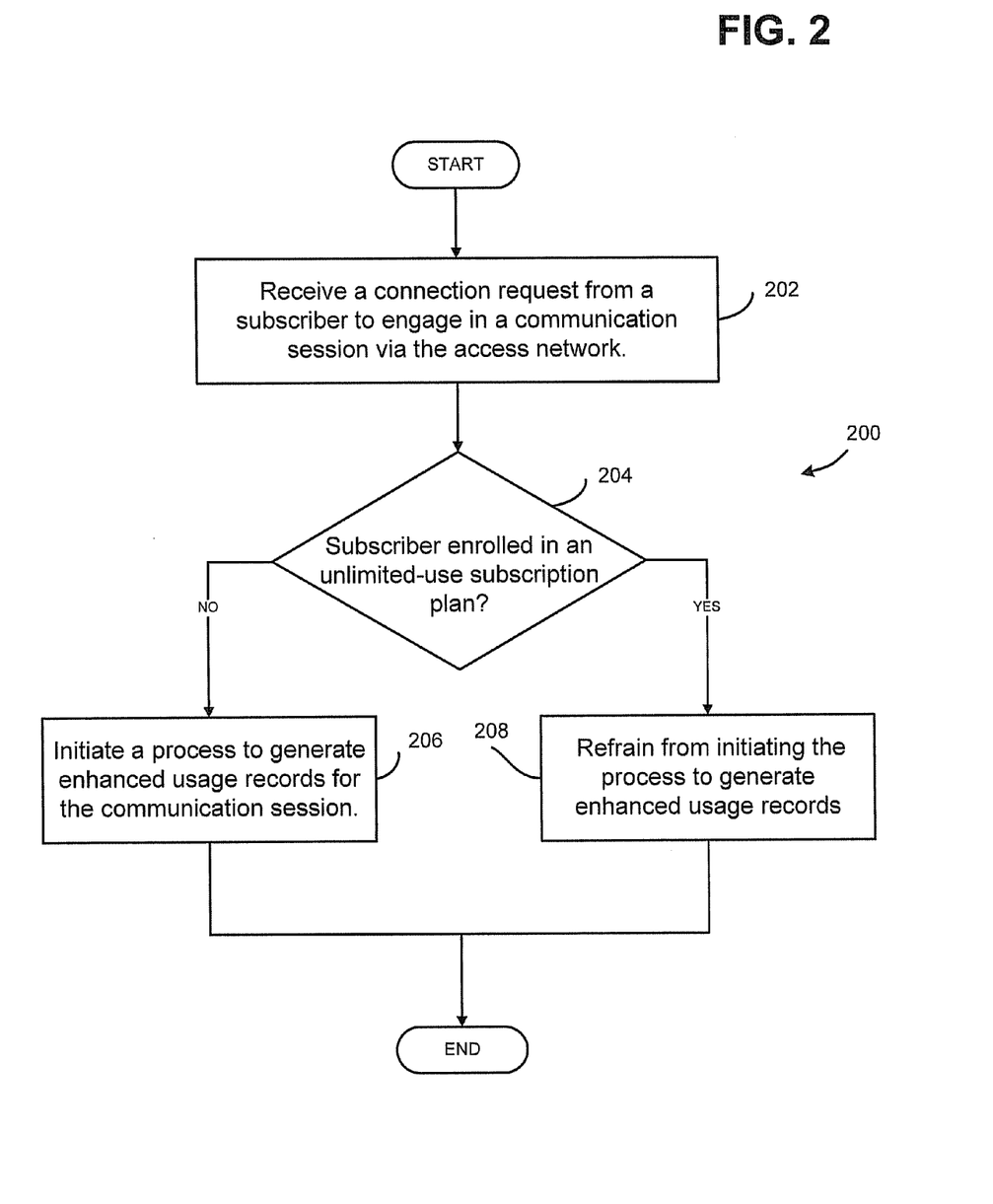
FIG. 2 is a flow chart illustrating a record-keeping method, according to an exemplary embodiment.

FIG. 2 is a flow chart illustrating a record-keeping method, according to an exemplary embodiment. The method is preferably implemented in an access network where a service provider offers two or more types of subscription plans, including an unlimited-use subscription plan and at least one other type of subscription plan (preferably a pay-per-use plan). Further, the method is described in reference to an exemplary embodiment where the method is carried out by a PDSN in a wireless access network. It should be understood that other entities or combinations of entities may also carry out the method or portions thereof, without departing from the scope of the invention.

The method involves a PDSN receiving a connection request from a subscriber to engage in a communication session via the access network, as shown in block 202. In response to the connection request, the PDSN determines whether or not the subscriber is enrolled in an unlimited-use subscription plan, as shown in block 204. If the determination is that the subscriber is not enrolled in the unlimited-use subscription plan (and thus is inferred to be enrolled in another type of subscription plan, such as a pay-per-use plan), then the PDSN initiates a process to generate enhanced usage records (e.g., E-UDRs) for the communication session, as shown in block 206. On the other hand, if it is determined that the subscriber is enrolled in an unlimited-use subscription plan, then the PDSN refrains from initiating the process to generate enhanced usage records, as shown in block 208.

The determination as to whether or not the subscriber is enrolled in an unlimited-use subscription plan may be made using various techniques. For example, whenever the PDSN receives a connection request, it may determine what type of subscription plan the requesting subscriber is enrolled in (or more simply, whether or not the subscriber is enrolled in an unlimited-use subscription plan). To do so, the PDSN may query the AAA for the subscription-plan type of the subscriber, or may be automatically provided with the subscription-plan type by the AAA. In order to provide the subscription-plan type, the AAA may query a customer database, which stores customer information, including subscription type. Preferably, the AAA provides the subscription-plan type in conjunction with the process of authorizing the subscriber. In an alternative embodiment, the PDSN may access a customer database directly to determine subscription-plan type. Other techniques for determining subscription-plan type are also possible.

The process that is initiated in order to generate enhanced usage records may be the process for generating and storing enhanced usage records (e.g., E-UDRs) as previously described herein. Summarizing, the process may involve a DPI system determining the destination (e.g., destination IP address), the subscriber ID, and the session ID for the session, as well as whether communications with the destination are billable. As described previously, the DPI system may use this information to generate and send E-UDRs to a mediation system (such as an AMS) where the E-UDRs may be aggregated and/or stored. Accordingly, the step of initiating the process to generate enhanced usage records may involve the PDSN signaling to the DPI system (or possibly to the HA) that E-UDRs should be generated for the session.

It should be understood that a service provider may offer multiple subscription plans of the same type. For instance, the service provider may offer multiple pay-per-use plans, each including a different number of voice minutes and/or a different amount of data usage, before overage fees (which may also vary) are applied. Furthermore, a service provider may offer other types of subscription plans in addition or in the alternative to unlimited-use subscription plans and pay-per-use subscription plans.

Regarding subscription plans that provide a predetermined amount of usage (i.e., a monthly quota) for a fixed fee, and charge per-unit overage fees (which are referred to herein as "capped-use" subscription plans), it should be understood that a PDSN may treat such a plan as a pay-per-use plan or as unlimited-use plan, or alternatively, as a hybrid of the two. For example, a capped-use subscriber may be treated in the same manner as a pay-per-use subscriber for record-keeping purpose (although billing procedures may obviously differ). Alternatively, a capped-use subscriber may be treated as an unlimited-use subscriber until it is determined that they have used their monthly quota. Then, for the remainder of the billing period, the capped-use subscriber may be treated as a pay-per-use subscriber. In such embodiments, the billing system or another entity may be configured to track a subscriber's usage and notify the PDSN when a subscriber has used their monthly quota. Further, capped-use subscribers may be treated in an entirely different manner from unlimited-use and pay-per-use subscribers.

It should also be understood that an exemplary method may also be used when a subscription plan combines multiple types of subscription plans for different services. For instance, an unlimited data plan may be offered in combination with a voice plan that includes only a certain number of minutes each billing period. In this scenario, the subscriber may be treated as having an unlimited-use subscription plan when the subscriber requests to connect for a data communication (and generate usage records accordingly), and may be treated as having a pay-per-use subscription plan when requesting to connect for a voice communication.

Figure 3:
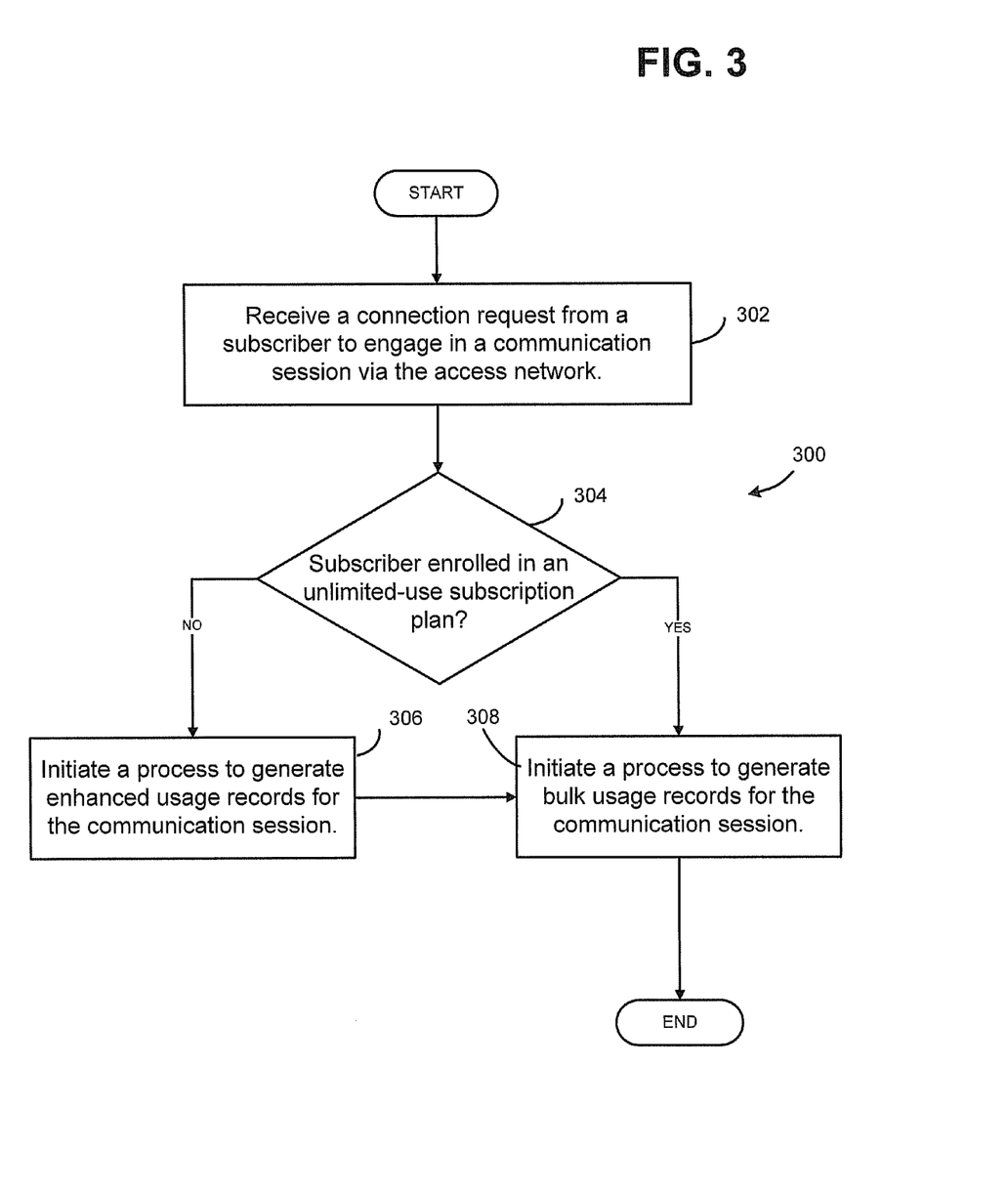
FIG. 3 is another flow chart illustrating a record-keeping method, according to an exemplary embodiment.

FIG. 3 is another flow chart illustrating a record-keeping method, according to an exemplary embodiment. In FIG. 3, blocks 302-306 may be implemented in a similar manner as blocks 202-206 of FIG. 2. However, in FIG. 3, the method further involves the PDSN initiating a process to generate bulk usage records for all communication sessions (regardless of subscription-plan type). Specifically, if the determination is that the subscriber is not enrolled in the unlimited-use subscription plan (and thus is inferred to be enrolled in another type of subscription plan, such as a pay-per-use plan), then the PDSN initiates a process to generate enhanced usage records, as shown in block 306, and initiates a process to generate bulk usage records, as shown in block 308. On the other hand, if it is determined that the subscriber is enrolled in an unlimited-use subscription plan, then the PDSN refrains from initiating the process to generate enhanced usage records, but still generates bulk usage records, as shown in block 308.

The process that is initiated in order to generate bulk usage records may be the process for generating and storing bulk usage records as previously described herein. Summarizing, the process may involve the PDSN/FA sending UDRs to an AAA, the AAA sending the UDRs on to an EAMS, and a mediation system or systems (such as an EAMS and/or AMS) and or billing system aggregating the UDRs to create bulk usage records. It should be understood, however, that other processes can be used to generate bulk usage records, without departing from the scope of the invention.

In an alternative embodiment, for an unlimited-use subscriber, the PDSN refrains from initiating both the process to generate bulk usage records, and the process to generate enhanced usage records. As a result, there are no records generated for subscribers enrolled in unlimited-use subscription plans. This variation may be particularly useful in scenarios where further reduction in the volume of records, beyond that provided by eliminating enhanced usage records, is desired (although it is not limited to such scenarios).

IV. Exemplary System for Initiating Record-Keeping Processes

Figure 4:
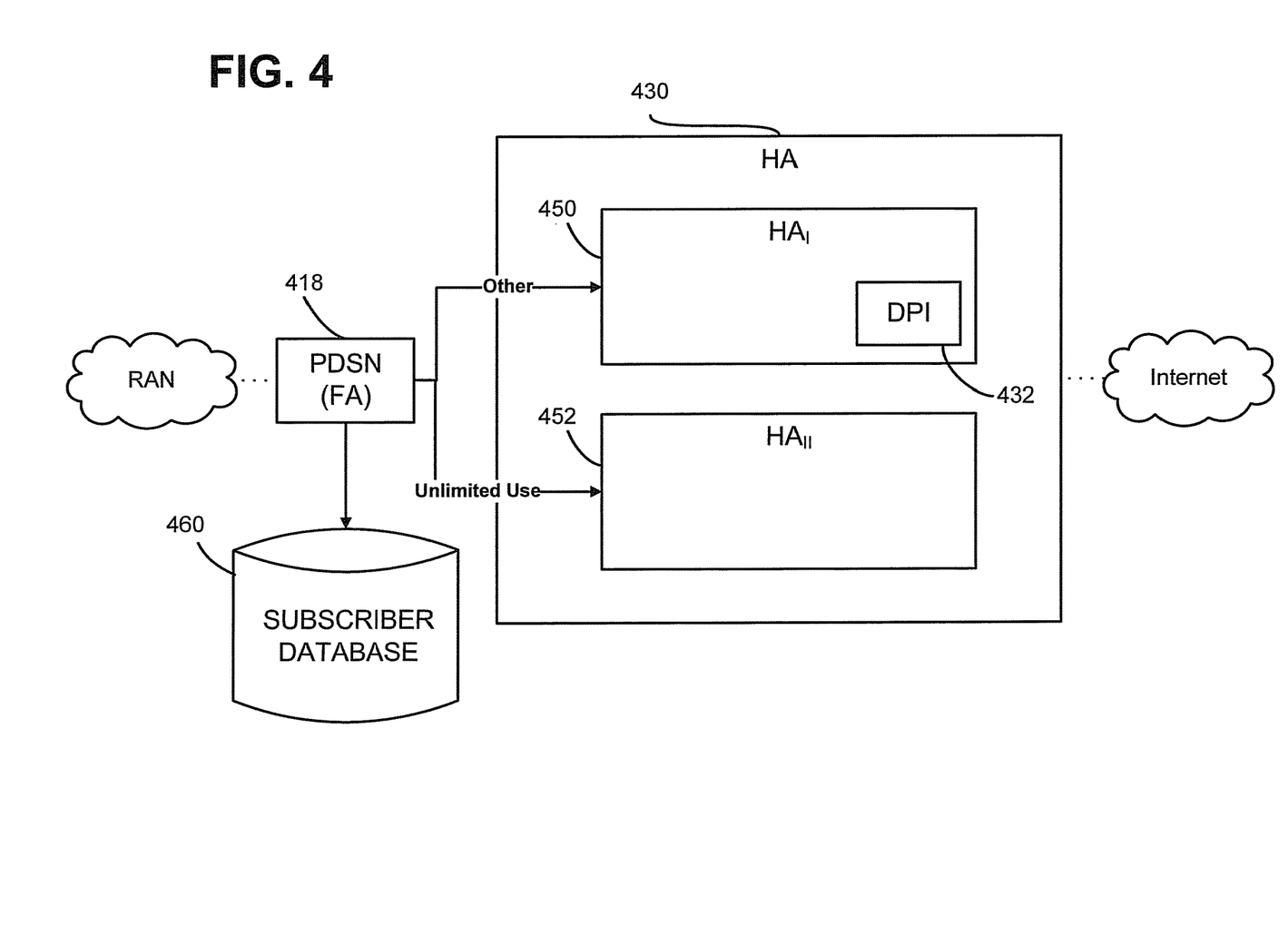
FIG. 4 is a simplified block diagram illustrating a system for initiating record-keeping processes, according to an exemplary embodiment.

FIG. 4 is a simplified block diagram illustrating a system for initiating record-keeping processes, according to an exemplary embodiment in which the system is implemented in a PDSN 418. The PDSN 418 may be configured to carry out an exemplary method such as those illustrated in FIGS. 2 and 3. In particular, PDSN 418 may include a communication interface configured to receive a connection request from a subscriber to engage in a communication session via an access network, at least one processor, and program instructions stored in data storage and executable by the at least one processor to (i) before or while resources are being allocated for the requested communication session, determine whether or not the subscriber is enrolled in an unlimited-use subscription plan; (ii) if the subscriber is not enrolled in the unlimited-use subscription plan, then initiate a process to generate one or more enhanced usage records for the communication session; and (iii) if the subscriber is enrolled in the unlimited-use subscription plan, then refrain from initiating the process to generate enhanced usage records for the communication session.

To facilitate this functionality, PDSN 418 may include or have access to a subscriber database 460, which maintains records of which subscription plans particular subscribers are enrolled in. PDSN 418 may therefore query subscriber database 460 to determine whether or not a subscriber is enrolled in an unlimited-use subscription plan. Alternatively, a subscriber database 460 may be included in or accessible to an associated AAA server (not shown). In this configuration, PDSN 418 may coordinate with the AAA server to determine the type of subscription plan in which a given subscriber is enrolled.

PDSN 418 is also communicatively coupled to HA 430, which includes a DPI system 432 that is configured to generate enhanced usage records. In the illustrated embodiment, HA 430 may be implemented so as to provide alternate data paths, which may be referred to as $HA_I$ 450 and $HA_{II}$ 452. In effect, $HA_I$ 1450 and $HA_{II}$ 452 function as separate HAs within the larger HA 430. $HA_I$ 450 includes the DPI system 432, whereas $HA_{II}$ 452 does not route communications through the DPI system. When such a configuration is implemented, the PDSN (FA) 418 may initiate the process to generate enhanced usage records by routing communications for unlimited-use subscribers through $HA_{II}$ 452. By doing so, the DPI system will not inspect data during the session, and E-UDRs will not be generated or provided to an AMS by the DPI system. For other subscribers, such as pay-per-use subscribers, the PDSN 418 routes communications through $HA_I$ 450 where the DPI system inspects the session data and generates E-UDRs for the session.

It should be understood that alternatively, HA 430 may not provide alternate data paths $HA_I$ 450 and $HA_{II}$ 452. In such an embodiment, PDSN 418 may be configured to signal to HA 430 whether or not enhanced usage records should be generated for a particular communication session, or alternatively, HA 430 may determine (based on the subscriber ID, for instance), whether a subscriber is enrolled in an unlimited use plan, and then proceed accordingly. Other configurations are also possible.

In an alternative embodiment, an exemplary system may be employed in an access network that implements "simple IP" for routing of data communications. When simple IP is implemented, mobility may be reduced as no HA is provided to facilitate the transfer of a communication session between access networks. In the absence of an HA, the PDSN and/or other network entities may provide the functionality described in reference to an HA herein, such as providing DPI functionality, for instance. More generally, it should be understood that the description herein is not intended to limit the invention to any particular type of access network or IP protocol.

Exemplary embodiments of the present invention have been described above. It should be understood the word "exemplary" is used herein to mean "serving as an example, instance, or illustration." Any embodiment described herein as "exemplary" is not necessarily to be construed as preferred or advantageous over other embodiments. In addition, those skilled in the art will understand that changes and modifications may be made to these exemplary embodiments without departing from the true scope and spirit of the invention, which is defined by the claims.

We claim:

1. A method for initialing record-keeping processes for usage of communication services by subscribers, wherein two or more types of subscription plans are available to the subscribers, wherein the two or more types of subscription plans comprise an unlimited-use subscription plan and at least one other type of subscription plan, the method comprising:

receiving, at an access gateway, a connection request from a subscriber to engage in a communication session via an access network;

responsive to the request, the access gateway making a determination as to whether or not the subscriber is enrolled in an unlimited-use subscription plan;

if the determination is that the subscriber is not enrolled in the unlimited-use subscription plan, then the access gateway initiating a process to generate one or more enhanced usage detail records (E-UDRs) for the communication session, wherein the one or more E-UDRs are generated by a deep packet inspection (DPI) system;

if the determination is that the subscriber is enrolled in the unlimited-use subscription plan, then the access gateway refraining from initiating the process to generate one or more E-UDRs for the communication session; and regardless of whether the subscriber is enrolled in the unlimited-use subscription plan, the access gateway generating and sending one or more usage detail records (UDRs) for the communication session, wherein generating and sending the one or more UDRs comprises sending the one or more UDRs to an authentication, authorization and accounting (AAA) server, wherein the AAA server periodically sends the UDRs it has received to an Enhanced Accounting Management System (EAMS), and wherein the EAMS uses the UDRs from the AAA server to generate one or more IP Data Records (IPDRs) for the communication session and sends the one or more IPDRs to an Accounting Mediation System (AMS).

2. The method of claim 1, further comprising, if the determination is that the subscriber is not enrolled in the unlimited-use subscription plan, generating the one or more E-UDRs for the communication session.

3. The method of claim 2, further comprising storing the one or more E-UDRs in data storage.

4. The method of claim 1, wherein the process to generate one or more E-UDRs for the communication session comprises:
using DPI functionality to obtain session information; and
generating the one or more E-UDRs, and including in the one or more E-UDRs the session information obtained using the DPI functionality.

5. The method of claim 4, wherein the session information comprises the destination of the communication session.

6. The method of claim 4, further comprising sending the one or more E-UDRs that include the session information to a mediation system.

7. The method of claim 1, wherein each UDR comprises one or more of (a) a session ID, (b) a subscriber ID, and (c) a quantity of usage.

8. A method for initialing record-keeping processes for usage of communication services by subscribers, wherein two or more types of subscription plans are available to the subscribers, wherein the two or more types of subscription plans comprise an unlimited-use subscription plan and at least one other type of subscription plan, the method comprising:
receiving a connection request from a subscriber to engage in a communication session via an access network;
before providing the requested connection, making a determination as to whether or not the subscriber is enrolled in an unlimited-use subscription plan;
if the determination is that the subscriber is not enrolled in the unlimited-use subscription plan, then a packet-data serving node (PDSN) initiating a process to generate enhanced usage records (E-UDRs) for the communication session, wherein the one or more E-UDRs are generated by a deep packet inspection (DPI) system; and
if the determination is that the subscriber is enrolled in the unlimited-use subscription plan, then:
the PDSN refraining from initiating a process to generate enhanced usage records for the communication session; and
initiating a process to generate usage detail records (UDRs) for the communication session, wherein generating the UDRs the process comprises sending the UDRs to an authentication, authorization and accounting (AAA) server, wherein the AAA server periodically sends the UDRs it has received to an Enhanced Accounting Management System (EAMS), and wherein the EAMS uses the UDRs from the AAA server to generate one or more IP Data Records (IPDRs) for the communication session and sends the one or more IPDRs to an Accounting Mediation System (AMS).

9. The method of claim 1, wherein initiating the process to generate the one or more E-UDRs for the communication session comprises routing the communication session through a home agent $HA_I$ that includes a deep packet inspection (DPI) system configured to generate data for E-UDRs.

10. The method of claim 9, wherein refraining from initiating a process to generate the one or more E-UDRs for the communication session comprises routing the communication session through a different home agent $HA_{II}$ that does not route communications through a DPI system, so that no E-UDRs for the communications session will be generated.

11. The method of claim 1, wherein initiating the process to generate the one or more E-UDRs for the communication session comprises signaling, to a home agent through which the communication session is routed, that E-UDRs should be generated for the communication session.

12. An access gateway configured to initiate record-keeping processes for usage of communication services by subscribers, wherein two or more types of subscription plans are available to the subscribers, wherein the two or more types of subscription plans comprise an unlimited-use subscription plan and at least one other type of subscription plan, the system comprising:
a communication interface configured to receive a connection request from a subscriber to engage in a communication session via an access network;
at least one processor;
program instructions stored in data storage and executable by the at least one processor to:
determine whether or not the subscriber is enrolled in an unlimited-use subscription plan;
if the subscriber is not enrolled in the unlimited-use subscription plan, then initiate a process to generate one or more enhanced usage detail records (E-UDRs) for the communication session, wherein the one or more E-UDRs are generated by a deep packet inspection (DPI) system;
if the subscriber is enrolled in the unlimited-use subscription plan, then refrain from initiating the process to generate one or more E-UDRs for the communication session; and
regardless of whether the subscriber is enrolled in the unlimited-use subscription plan, initiate a process to generate one or more usage detail records (UDRs) for the communication session, wherein the process to generate the one or more UDRs comprises sending the one or more UDRs to an authentication, authorization and accounting (AAA) server, wherein the AAA serer periodically sends the UDRs it has received to an Enhanced Accounting Management System (EAMS), and wherein the EAMS uses the UDRs from the AAA server to generate one or more IP Data Records (IPDRs) for the communication session and sends the one or more IPDRs to an Accounting Mediation System (AMS).

13. The access gateway of claim 12, wherein the access gateway is implemented in a PDSN.

14. The access gateway of claim 12, further comprising program instructions stored in data storage and executable by the at least one processor to query a subscriber database in order to determine whether or not the subscriber is enrolled in an unlimited-use subscription plan.

15. The access gateway of claim 12, wherein the program instructions stored in data storage and executable by the at least one processor to initiate the process to generate one or more E-UDRs comprise:

program instructions stored in data storage and executable by the at least one processor to signal to a DPI system to generate one or more E-UDRs for the communication session.

16. The access gateway of claim 15, wherein the DPI system determines the destination of the communication session, and wherein at least one of the E-UDRs comprises the destination of communication session.

17. The access gateway of claim 15, wherein the DPI system determines the destination of the communication session and whether the destination is billable or non-billable, wherein at least one of the E-UDRs comprises an indication of whether the destination is billable or non-billable.

18. The access gateway of claim 12, wherein each UDR comprises one or more of (a) a session ID, (b) a subscriber ID, and (c) a quantity of usage.

* * * * *